US006800331B2

(12) United States Patent
Bilyk et al.

(10) Patent No.: US 6,800,331 B2
(45) Date of Patent: Oct. 5, 2004

(54) PREPARATION OF FUNCTIONAL POLYMERIC SURFACE

(75) Inventors: Alexander Bilyk, St Kilda East (AU); Sheng Li, Wheelers Hill (AU); Wei Dong Yang, Clayton (AU); Pamela Maree Hoobin, Mt. Waverley (AU); Lee Joy Russell, Moonee Ponds (AU); Wojciech Stanislaw Gutowski, Frankston (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 0 days.

(21) Appl. No.: 10/120,252

(22) Filed: Apr. 11, 2002

(65) Prior Publication Data

US 2003/0194504 A1 Oct. 16, 2003

(51) Int. Cl.[7] ................................................ B05D 1/36
(52) U.S. Cl. ..................................... 427/387; 427/412.1
(58) Field of Search ............................... 427/387, 412.1

(56) References Cited

U.S. PATENT DOCUMENTS

| 4,244,817 A | 1/1981 | Yaginuma |
| 4,268,423 A | 5/1981 | Rohrbach et al. |
| 4,521,564 A | 6/1985 | Solomon et al. |
| 5,053,048 A | 10/1991 | Pinchuk |
| 5,213,898 A | 5/1993 | Larm et al. |
| 5,344,455 A | 9/1994 | Keogh et al. |
| 5,891,506 A | 4/1999 | Keogh |
| 5,922,161 A | 7/1999 | Wu et al. |

FOREIGN PATENT DOCUMENTS

| JP | 11-034250 | * | 2/1999 |
| WO | WO 98/31539 | | 7/1998 |
| WO | WO 98/31719 | * | 7/1998 |

OTHER PUBLICATIONS

J. G. Marsden, "Organofunctional Silane Coupling Agents", 1990, Handbook of Adhesives, pp. 536–555.

J. Comyn, "Silane Coupling Agents", Jan. 1, 1986, Structural Adhesives: Developments in Resins and Primers, pp. 269–312.

* cited by examiner

*Primary Examiner*—Erma Cameron
(74) *Attorney, Agent, or Firm*—Pillsbury Winthrop LLP

(57) ABSTRACT

A method of modifying a polymeric surface of a substrate including: (i) providing the polymeric surface with functional groups; and (ii) contacting the surface with (a) a polyamine compound reactive with the surface functional groups, said polyamine comprising at least four amine groups including at least two amine groups selected from primary and secondary amine groups, and (b) crosslinking agent reactive with the polyamine to provide a crosslinked network grafted to the substrate surface.

35 Claims, No Drawings

PREPARATION OF FUNCTIONAL POLYMERIC SURFACE

FIELD OF THE INVENTION

The invention relates to a method of modifying a polymeric surface of a substrate to control the surface chemistry. The invention also relates to a method of improving the bonding of a substrate having a polymeric surface with adhesives, coatings, functional molecules and other materials.

BACKGROUND OF THE INVENTION

Polymeric or polymer based surfaces are often difficult to wet and bond or to perform other specific functions because of low surface energy, incompatibility, chemical inertness, or the presence of contaminants and weak boundary layers. The lack of adequate adhesion at the substrate/adherent and/or reinforcement/matrix interfaces often results in poor material performance and limits the possible applications of the products of polymeric materials. Effective surface treatments are frequently required to overcome one or more of the above mentioned difficulties in order to achieve controlled or maximized composite performance and controlled level of adhesion with paints, adhesives, coatings, bio-active materials etc.

The durability of interface adhesion of an assembly subjected to high humidity, fluctuation of temperature and UV irradiation are very critical when the products are for out door application, such as painted external plastics components used in automobile industries. The hydrothermal stability of the interface/interphase often determines the success of the surface modification process.

Polymer based materials are often required to provide surface properties such as good adhesion or chemical linkage to another material and at the same time provide a diverse range of physico-chemical properties such as strength, flexibility or elasticity, inertness or reactivity, electrical or heat conductivity, wettability for various applications.

An example of a specific application is the electrostatic painting process on polymer based substrates. The electrostatic painting process has advantages over conventional painting process as up to 80% less paint is used and the VOC can be greatly reduced when less paints are used. To satisfy the electrostatic painting requirements the surface/interface layer of polymer based materials must possess electrical conductivity and good adhesion to both substrate and paints.

Controlled wettability of polymer surfaces is another example of multi-functional surface/interface in practical applications. Solid polymeric material surfaces may also be required to exhibit a specific level or gradient of wettability by organic and/or inorganic liquids or vapours of these liquids. Depending on specific end-applications, the liquid phase or condensate may be required to form a permanent uniform film on the wettable solid's surface, or alternatively it may be required to bead-up on an unwettable liquid-repellent surface, a hydrophobic surface. It is also possible that in some instances, an intermediate level of wettability is desirable. The surface/interface with a specified or well defined wettability must overcome the adverse effects of polymer surface restructure and continuous washing cycles to remain effective.

Polymeric materials used in biomedical field and in the sensor area are another important applications of the multi-functional surface/interface. To design a useful biomedical material, it is important to consider both bulk and surface properties of the material. Historically, selection of a biomedical material for a particular application has been based upon bulk property specifications. However, there is increasing recognition that a biomedical material must exhibit a specific surface chemical behaviour in order to minimise interfacial problems with host tissues and fluids. Thus, the surface of the polymeric material is often chemically modified to control the interface/interphase behaviour with biological systems. To achieve this, the common practice is to activate the polymer surface by grafting chemically reactive groups (such as amines) onto the surface then attach bioactive or bio-compatible molecules to this reactive surface. Molecules that possess recognition ability can be grafted onto the activated polymeric surface to form sensors.

Various surface treatment processes have been developed to achieve different specific requirements. These include chemical oxidation with the use of oxidising agents; surface chemical grafting and various physical-chemical methods such as corona discharge; flame treatment; plasma treatment; and UV irradiation. Simple oxidative treatments by flame treatment, corona discharge, or chemical oxidation generally lead to a noticeable increase in surface hydrophilicity, and bonding ability as a result of the occurrence of oxygenated groups such as carboxyl, hydroxyl and carbonyl on the modified polymer surfaces. Such a modified surface is, however, not stable and the chemistry and increased hydrophilicity is not permanent. This may be due to the partial removal of low molecular weight oxidised material by a polar solvent or water from the oxidised surface. Alternatively, or in addition, it may be due to the reorientation of the surface functional groups, which rotate inwardly into the bulk of the polymer during the storage or use. It is also well know that molecular scission occurs during oxidative treatment which lead a reduction of molecular weight at the surface layer and may reduce the adhesion performance. This becomes more important when the interface/interphase is subjected to a range of conditions that can effect long term durability of the product.

Plasma treatment methods which may involve plasma polymerisation are known to significantly improve bonding ability of the treated polymers and to provide the desired level of wettability. Plasma treatment can achieve these objectives by using a suitable gas or monomer to selectively incorporate different types of chemical species onto the polymer surface under controlled process conditions. However like an oxidised surface the plasma treated polymer surface is not stable in storage because of rotation and migration of the generated surface functional groups into the bulk material and the occurrence of post-chemical reactions at the modified surfaces. An additional drawback with plasma treatment or plasma polymerisation resides in the expensive process apparatus required and the high cost associated with the on-going operations and the difficulties experienced in carrying out the surface treatment continuously.

International Patent Application No. PCT SE89-00187 discloses a method of increasing the hydrophilicity of the polymer surface by a 3-steps process comprising: (1): producing carboxyl, carbonyl and hydroxyl groups on the polymer surface by an oxidation treatment process such as etching with oxidising acid solutions, corona discharge, flame and plasma treatment; (2) reacting the groups on the oxidised polymer surface with a compound belonging to the following groups A and B, wherein group A includes heterocyclic compounds having three or four ring atoms, such as oxiranes, thiiranes, aziridines, azetidinones, oxetanes, and group B includes carbodiimides (R—N=C=N—R') and isocyanates (R—N=C=O, or N=C=O—R—O=C=N). The reaction according to step (2) has to be carried out in aprotic organic solvents, such as ketones and ethers due to the fact that the compounds in groups A and B are not stable in aqueous solution, and (3) post-treating the polymer material previously treated according to step (2) with further application of compounds containing nucleophilic groups, such as alcohols, water, amines, carboxylic acids and hydroxycarboxylic acids which react with the modified surface either by opening aziridine rings, or reacting with the residual isocyanate groups.

Japanese Patent Publication No. Sho 56-16175 teaches that the poor bonding between an oxidised polyolefin and resorcinol or epoxy adhesive is due to the inability of the adhesive resin molecules to microscopically approach polar groups at an oxidised polymer surface. The method proposed to alleviate this problem involves treating the oxidised surface with a low viscosity solution of a low molecular weight compound whose chemical constituents are the same as or similar to those used for the cure of the two-component epoxy or resorcinol adhesives. These, in turn, affiliate with the polar groups of the oxidised polymer and subsequently act as a setting agent for the adhesive resin. The process described in the document is stated to be effective when the setting agent is not of the oxidative type. In the step of treating the oxidised surface of the polyolefin a 1 to 5% aqueous solution of a low molecular weight amine is applied which is dried on the surface and the surface is subsequently bonded using resorcinol or epoxy adhesive at about 80° C. We have found that the amines, when applied by this method, act as a weak boundary layer having an adverse effect on adhesion. Our earlier inventions relating to surface modifications include U.S. Pat. No. 5,879,757; U.S. Pat. No. 5,872,190 and U.S. Pat. No. 5,922,161.

U.S. Pat. No. 5,879,757 relates to surface treatment of polymers for enhanced adhesion of adhesives, sealant, paints and other organic or inorganic materials. The patent discloses a method of modifying at least part of the surface of a polymer or polymer matrix composite material including: (i) oxidising at least part of the surface of the polymer or polymer matrix material and (ii) subsequently treating the oxidised surface with an organo-functional coupling agent simultaneously with a static and/or a high frequency alternating physical field.

In the U.S. Pat. No. 5,872,190, a surface treatment of rubber and rubber-based materials is disclosed and relevant state-of-art in this field is critically assessed. The method according to this invention addresses increasing the bonding capability of solid vulcanized rubber material with other materials, which comprises the steps of:
(i) treating at least part of a surface of said solid vulcanized rubber material with a halogenating agent while simultaneously subjecting said surface to a static and/or high frequency physical field to provide a halogenated surface; and
(ii) treating the halogenated surface with at least one coupling agent. The coupling agent is selected from the group consisting of organo-silicon compounds, organo-titanates, organo-zirconates, organo-aluminates and mixtures of two or more thereof.

U.S. Pat. No. 5,922,161 describes a method of modifying the surface of polymer based substrate including: (i) oxidising at least part of the surface of the polymer and (ii) treating the oxidised surface with a polyamine compound or an organic compound containing at least one amine group to bind said compound to the oxidised polymer surface. This invention provides a method for the production of a modified polymeric surface using a single or multilayer grafting process which has the following applications;
enhanced adhesion of polymer substrate to adhesives paints, sealants, printing inks, metal coating and coatings used for voice and image recording
controlled/optimised wettability of solids' surfaces
provide hydrophobicity for otherwise wettable surfaces
bio-compatible and bio-medical surfaces
drug delivery systems
clinical/pathology test devices and surfaces.

U.S. Pat. No. 5,922,161 and U.S. Pat. No. 5,879,757 provide simple methods to modify polymer surfaces and significantly improve the adhesion of polymeric substrate to adhesives, paints, coatings and inks. However, relatively weak interactions exist between the polyamine molecules consequently the polyamine compounds grafted onto the surface of polymeric materials can only be applied as a very thin layer, otherwise poor adhesion will result. We have also found that the newly created surface functionalities may loose their reactivity or disappear altogether with time when vigorous surface reorientation occurs. It was also found that inadequate adhesion was observed when the painted coated or otherwise adhered assembly was required to withstand extensive durability testing under high humidity, high temperature and UV irradiation. The reduction of interface adhesion may be a result of the inter-diffusion of water to the interface/interphase and the attack of water molecules on the structure of the grafted amine chemicals.

We have now discovered, as disclosed in the current invention, that the long term durability of interface adhesion is remarkably improved when at least one crosslinking compound is used in combination with a polyamine compound and applied onto an oxidised polymer surface to form a crosslinked surface layer. This invention also provides a method of activating the polymeric surface of a substrate to introduce chemically more reactive groups to facilitate surface tailoring. The formation of a crosslinked polyamine network has the significant advantage over the prior art as we have found that the crosslinking structure is more effective in restricting the surface reorientation and thereby improving the stability of chemical functionalities created on the surface. In one embodiment of the current invention functional molecules and/or fillers can be added to the crosslinkable polyamine formulation to provide surface layers with satisfactory adhesion to polymer based materials and a diverse range of other physico-chemical properties that maybe required in various applications

SUMMARY OF THE INVENTION

The invention provides a method of modifying a polymeric surface of a substrate including:
(i) providing the polymeric surface with functional groups; and
(ii) contacting the surface with (a) a polyamine compound reactive with the surface functional groups said polyamine comprising at least four amine groups including at least two amine groups selected from primary and secondary amine groups and (b) a crosslinking agent reactive with the polyamine;
to provide a crosslinked network grafted to the substrate surface.

The surface may be treated with the polyamine and crosslinking agent in sequence or the surface may be treated with a mixture of the polyamine and crosslinking agent.

It will be understood that the cross-linking agent may react with the polyamine before the polyamine reacts with the surface functional groups. Accordingly the present invention includes an embodiment in which the polyamine and crosslinkers are reacted to form a reaction product thereof which is used in contacting the surface.

Polymer Substrate

By the term "polymeric material or polymeric substrate", as used herein, we mean homo-polymers, co-polymers, natural and synthetic rubbers and their blends and alloys with other materials such as inorganic fillers, and matrix composites. These polymeric materials may be used as materials on their own or alternatively as an integral and uppermost part of a multi-layer laminated sandwich comprising any materials such as polymers, metals, ceramics or an organic coating on any type of substrate material. The term "polymer" includes thermoset and thermoplastic polymers and mixtures thereof.

Examples of the polymeric materials suitable for surface modification by this invention include: polyolefins such as low density polyethylene (LDPE), polypropylene (PP), high density polyethylene (HDPE), ultra high molecular weight polyethylene (UHMWPE); blends of polyolefins with other polymers or rubbers or with inorganic fillers; polyethers such as polyoxymethylene (Acetal), polyamides, such as poly(hexamethylene adipamide) (Nylon 66); halogenated polymers, such as polyvinylidenefluoride (PVDF), polytetra-fluoroethylene (PTFE), fluorinated ethylene-propylene copolymer (FEP), and polyvinyl chloride (PVC); aromatic polymers, such as polystyrene (PS); ketone polymers such as polyetheretherketone (PEEK); methacrylate polymers, such as polymethylmethacrylate (PMMA); polyesters, such as polyethylene terephthalate (PET); polyurethanes; epoxy resins; and copolymers such as ABS and ethylenepropylenediene (EPDM). Natural or synthetic rubber referred to in this patent includes pure rubber, mixture of rubber blends or alloys of rubber with polymer. The rubber can be in virgin or vulcanised or crosslinked form while vulcanised rubber is preferable. Suitable rubbers and rubber based materials for use in the invention include, but are not limited to, natural rubber, ethylene-propylene diene rubber, synthetic cis-polyisoprene, butyl rubber, nitrile rubber, copolymers of 1,3-butadiene with other monomers, for example styrene, acrylonitrile, isobutylene or methyl methacrylate, and ethylene-propylene-diene terpolymer. The term "vulcanised rubber" as used herein includes vulcanised rubbers and vulcanised rubbers mixed with fillers, additives, and the like. Examples, of filler and additives include carbon black, silica, fiber, oils, and zinc oxide.

Suitable polymer surfaces for the application of polyamine formulation of the current invention also include polymer containing surface reactive groups of type carboxylic, hydroxyl, anhydride, ketone, ester and epoxy introduced through bulk modification and blend with polymer containing these functionalities. The bulk modification includes but not limited to bulk grafting or reactive extrusion of polymers with monomers containing unsaturated groups such as glycidyl(meth)acrylate, maleic anhydride, maleic acid, (meth)acrylate ester. Preferable polymers are polyolefins grafted with maleic anhydride or maleic acid and glycidyl(meth)acrylate such as commercial product of polypropylene-graft-maleic anhydride, polyethylene-graft-maleic anhydride, poly(ethylene-co-glycidyl methacrylate). Typical polymer blends include polymer blended with maleated polyolefin, homopolymer or copolymer of glycidyl (meth)acrylate or maleic anhydride such as commercial products of poly(ehtylene-alt-maleic) anhydride, poly (isobutyl-alt-maleic anhydride), poly(ethylene-co-vinyl acetate)-graft-maleic anhydride.

The polymer materials to be treated may be in the forms of flat sheets, films, complex shaped articles, particulate or powders, woven or non-woven fabrics, individual fibres and mixtures thereof. These can be solid polymeric mono-materials, laminated products or hybrid materials, or alternatively organic coatings on any type of base substrate which can be non-metallic or metallic in nature.

Initial Surface Modification of Polymeric Substrate

Many suitable methods are known to modify at least part of a polymer surface to improve the interaction of the polymer surface with polyamino compounds. The most common treatment is oxidation of the polymer surface but other surface modification methods such as sulfonation with sulfur trioxide gas, or halogenation can also lead to a surface suitable for the grafting of polyamino compounds. Surface oxidation techniques which can be used for this invention include for example corona discharge, flame treatment, atmospheric plasma, non-depositing plasma treatment, chemical oxidation, UV irradiation and/or excimer laser treatment in the presence of an oxidising atmosphere such as: air, oxygen ($O_2$), ozone ($O_3$), carbon dioxide ($CO_2$), Helium (He), Argon (Ar), and/or mixtures of these gases. However, for the present technique of an electrical discharge for instance corona discharge or atmospheric plasma, flame treatment, chromic acid treatment, halogenation or combination thereof are preferred.

Suitable corona discharge energies range from 0.1–5000 mJ/mm$^2$ but more preferably 2–800 mJ/mm$^2$. Corona discharge treatment may be carried out in the presence of the following atmospheres: air, oxygen ($O_2$), ozone ($O_3$), carbon dioxide ($CO_2$), Helium (He), Argon (Ar), and/or mixtures of these gases. Suitable treatment times and discharge energies can be calculated using the following equations:

$$t = d/v_1 \text{ (or } v_2\text{) and}$$

$$E = Pn/lv_1 \text{ or}$$

$$E = Pn/lv_2$$

t=treatment time for a single pass of treatment under the electrode d=electrode diameter E=discharge energy P=power energy n=number of cycles of treated substrate moving under the electrode l=length of treating electrode $v_1$=speed of treating table $v_2$=speed of conveyor tape (i.e. continuous treatment)

When non-depositing plasma glow discharge treatment is used, the range of suitable energy is 5–5000 Watts for 0.1 seconds to 30 minutes, but more preferably 20–60 Watts for 1 to 60 seconds. Preferable gases are air, oxygen, water or a mixture of these gases.

Alternatively, any known flame treatment may be used to initially oxidise at least part of the surface of the polymer or polymer based material. The range of suitable parameters for the flame treatment are as follows: the oxygen ratio (%) detectable after combustion from 0.05% to 5%, preferably from 0.2% to 2%; treatment speed from 0.1 m/min to 2000 m/min, preferably from 10 m/min to 100 m/min; treatment distance from 1 mm to 500 mm, preferably from 5 mm to 100 mm. Many gases are suitable for flame treatment. These include, but are not limited to: natural gases, pure combustible gases such as methane, ethane, propane, hydrogen, etc or a mixture of different combustible gases. The combustion mixture also includes air, pure oxygen or oxygen containing gases.

Similarly, chemical oxidation of at least part of a polymer surface can be effected with any known, standard etching solutions, such as chromic acid, potassium chlorate-sulfuric acid mixtures, chlorate-perchloric acid mixtures, potassium permanganate-sulfuric acid mixtures, nitric acid, sulfuric acid, peroxodisulphate solution in water, chromium trioxide, or a dichromate solution in water, chromium trioxide dissolved in phosphoric acid and aqueous sulphuric acid, etc. More preferably, chromic acid treatment is used. The time taken to complete the treating process can vary between 5 seconds to 3 hours and the process temperature may vary from room temperature to 100° C.

Alternatively, halogenation may be used to modify at least part of polymer surface with a halogenating agent to improve the interaction of polymer surface with polyamino compounds. The halogenation treatment is more preferable for polymer being any natural or synthetic rubber. Suitable halogenating agent may be an inorganic and/or organic halogenating agents in an aqueous or non-aqueous or mixed solvents.

Suitable inorganic halogenating agent include but not limited to fluorine, chlorine, iodine, and bromine as pure gas or any mixture with nitrogen, oxygen, argon, helium or in solutions and acidified hypochlorite solutions. Suitable organic halogenating agents include but not limited to N-halohydantoins, N-haloimides, N-haloamides, N-chlorosulphonamides and related compounds, N, N'-dichlorobenzoylene urea and sodium and potassium dichloroisocyanurate. Specific examples are 1,3-dichloro-5, 5-dimethyl hydantoin; 1,3-dibromo-5,5-dimethyl hydantoin; 1,3-dichloro-5-methyl-5-isobutyl hydantoin; 1,3-dichloro-5-methyl-5-hexyl hydantoin, N-bromoacetamide, tetrachloroglycoluril, N-bromosuccincimide, N-chlorosuccinimide, mono-, di-, and tri-chloroisocyanuric acid. Trichloroisocyanuric acid is especially preferred. The halogenation may be carried out at room temperature or at elevated temperature in gas phase or in solution with or without the use of ultrasonication energy. More specified treatment conditions are referred to U.S. Pat. No. 5,872,190 and the related prior art.

Polyamine Compound

The polyamine compounds used in accordance with this invention may be any compound which contains 4 or more amine groups with at least two of these amine groups being primary or secondary amines wherein primary amines have the general formula $NH_2R$ and secondary amines have the general formula $NHR_2$, where R is an any organic fragment such as an alkyl aryl, vinyl, substituted alkyl, substituted aryl, substituted vinyl or any mixture of these etc.

The polyamine compounds may be polymeric or non-polymeric compounds. Polymeric polyamino compounds should contain multiple amine groups, at least 4, with at least two but preferably more of these amine groups being primary or secondary amines. The molecular weight of these polymers is between 200 and 200000. In a preferred embodiment of this invention the polyamino polymers can be homopolymers containing the monomers, ethylenimine, allylamine, vinylamine, 4-aminostyrene, aminated acrylate/methacrylate, or as copolymers made from a combination of these monomers or as a copolymers containing at least one of these monomers with any other suitable monomer such ethylene, propylene, acrylate/methacrylate and ethylene oxide.

Non polymeric compounds which include linear and carbon cyclic multi amine compounds may be used. These compounds have 4 or more amine groups, with at least two of these amine groups being either primary or secondary amines. Examples of such compounds are triethylene tetraamine, tris (2-aminoethyl)amine, tetraethylene pentaamine, pentaethylene hexaamine, benzene tetraaminie.

The polyamine compounds can be used as single polyamine components or as combinations of polyamine compounds described above. The concentration of the polyamine compound is between 0.000001% to 50% by weight, preferably between 0.001% and 5% by weight with the most useful concentration range being 0.01% to 1% by weight. A preferred embodiment of this invention is the use of PEI compounds, linear or branched with a molecular weight range of 200 to 750000, examples of which are Lupasol FC, Lupasol WF or Lupasol PS (BASF).

Crosslinkers

The crosslinkers used in this invention are defined as compounds or polymers that contain at least two functional groups with at least one of these groups capable of reacting with the amino groups of the polyamino compounds so that a stable bond is formed between the polyamino compound and the crosslinker. The other functional group on the crosslinker should be able to join at least two polyamino molecules by either reacting with the amino group of another polyamino molecule or by bond formation with the functional group of another crosslinker molecule or by reaction with a co-crosslinking compound which is defined as a compound capable of bond formation with at least two crosslinking molecules. Functional groups which are suitable for initial reaction with the polyamino group include but are not limited to epoxides, anhydrides, acid chlorides, sulfonyl chlorides, ketones, aldehydes, carboxylic acids, esters, isocyanates, vinyl groups susceptible to Michael addition reactions such as acrylate, methacrylate, acrylamide, alkyl halides, alkynes etc. The other functional group, which is responsible for the final crosslinking step can be silanes, epoxides, anhydrides, acid chlorides, sulfonyl chlorides, ketones, aldehydes, carboxylic acids, isocyanates, acrylate or methacrylate esters, alkyl halides etc.

Preferably the mass ratio of polyamino compound to crosslinker is 100:1 to 1:100 with about 10:1 to 1:10 being preferred.

The type and combination of functional groups on the crosslinker is important because the crosslinker used should enable crosslinking to take place at the surface of the polymeric substrate and minimise crosslinking before application. The crosslinking reaction can be controlled by designing a system where either:

A. initial reaction with polyamino molecules is fast but the crosslinking step is slow;
B. dilute solutions are used so that crosslinking reaction is slow and is much faster when the polyamino/crosslinker formulation is concentrated on the oxidised polymeric material;
C. a reagent is used which inhibits crosslinking in solution but once the formulation is applied to the surface the inhibitor is removed;
D. mixing of the polyamino compound and crosslinker takes place prior to application on the polymeric surface;
E. a reagent or catalyst is added to the formulation that induces crosslinking of the polyamino compound just prior to application to the polymeric substrate;
F. the polyamine compound and crosslinker are added in two steps;
G. a combination of these strategies is used.

Silane Crosslinking Agents

A preferred embodiment of this invention is the use of functionalised silanes which contain at least one organic functional group for reaction with the amine and a silane group which will condense with other silane groups upon addition of water, forming with SI—O—Si bonds for crosslinking. The general formula for the crosslinking silane is X—Si—$R^1(R^2)_2$, where 1. X is any organic fragment containing at least one of the following groups; epoxide, anhydride, acid chloride, chloroformate, ketone, aldehyde, carboxylic acid, isocyanate, acrylate or methacrylate ester, acrylamide or an alkyl halide and containing form 3 to 60 carbon atoms.
2. $R^1$ is a group susceptible to hydrolysis such as an alkoxide containing 1 to 30 carbon atoms, chloride or carboxylate containing from 1 to 30 carbon atoms.
3. $R^2$ can also be a group susceptible to hydrolysis such those selected from the group consisting of an alkoxide containing 1 to 30 carbon atoms, chloride and carboxylate containing from 1 to 30 carbon atoms, $R^2$ can also be selected from the group of alkyl, aryl, vinyl, substituted alkyl, substituted vinyl, substituted aryl or any combination of these groups containing 1 to 40 carbon atoms. $R^2$ can also be any organic fragment containing at least one of the following groups; epoxide, anhydride, acid chloride, chloroformate, ketone, aldehyde, carboxylic acid, isocyanate, acrylate or methacrylate ester, acrylamide or an alkyl halide and containing form 3 to 60 carbon atoms.

There are many silanes which can be used in this invention and in a preferred embodiment of this invention the silane is defined as X—$R^1$—Si—$R^2(R^3)_2$ where:

1. $R^1$ is an alkene group with the general formula $C_nH_{2n}$ where n=0 to 12 or a benzyl group with the formula $CH_2C_6H_4$.
2. X comes from the group: methacryloxy, acryloxy, acetoxy, chloride, bromide, iodide, glycidoxy, carbomethoxy, 4-chlorosulfonylphenyl, isocyanate, chloroformate, carbochloride, 3,4-epoxycyclohexyl or ureido.
3. $R^2$ is either a chloride, an alkoxy with the general formula $OC_nH_{2n+1}$ where n=1 to 12 or a carboxylate with the general formula $O_2CC_nH_{2n+1}$ where n=1 to 11.
4. $R^3$ comes from the group chloride, alkoxy with the general formula $OC_nH_{2n+1}$ where n=1 to 12, phenyl, cyclohexyl, cylclopentyl and alkyl with the general formula $C_nH_{2n+1}$ where n=1 to 12.

The crosslinking silanes of this invention can be used in any combination as well as in partially or fully hydrolysed states as expected after exposure to water. Also one or more co-crosslinking silanes may be added to the polyamino silane crosslinking formulation. It is not necessary for the co-crosslinking silane to directly attach itself to the polyamino compound as it will be incorporated into the grafted interphase during the crosslinking processes via Si—O—Si bonding with the crosslinking silane directly bonded to the polyamino compound. The co-crosslinking silane is a compound that contains one or more silane groups which are defined by the general formula $SiR^1R^2R^3R^4$ where:

1. $R^1$ and $R^2$ are hydrolysable groups such as alkoxides with the general formula $OC_nH_{2n+1}$ where n=1 to 12, chlorides or carboxylates with the general formula $O_2CC_nH_{2n+1}$ where n=1 to 12.
2. $R^3$, $R^4$ can also be hydrolysable groups such as alkoxides with the general formula $OC_nH_{2n+1}$ where n=1 to 12, chlorides or carboxylates with the general formula $O_2CC_nH_{2n+1}$ where n=1 to 12. $R^3$, $R^4$ can also be alkyl, aryl, vinyl, substituted alkyl, substituted vinyl, substituted aryl or any combination of these groups containing 1 to 40 carbon atoms.

Aldol Condensation Products as Crosslinkers

In another preferred embodiment the organic crosslinking agent can contain aldeheyde or ketone functional groups or combinations thereof which can polymerize by an aldol condensation process and the resulting oligomers or polymers can act as crosslinkers for polyamino compounds. Examples of such crosslinking agents are glutaraldehyde, methyl or ethyl-pyruvate, pyruvic aldehyde, methyl or ethyl—levunate. Also mixtures of aldeheydes and ketones can be used for example formaldehyde, glyoxal or glutaraldehyde can be mixed with ketones or other aldehyde with the general formula $C_nH_{2n+1}CO\ C_mH_{2m+1}$ where n=1 to 6 and m=0 to 6. The crosslinker can come from any combination of these compounds and the condensation reaction to form the crosslinker can occur on mixing with the polyamino compound or they can be prepared prior to the addition of the polyamino compound using any known acid, base or metal catalyst suitable for aldol condensation reactions.

Methylol Crosslinkers

This group of crosslinkers incorporate reactive methylol groups. They are obtained from the reaction of 2 or more molar equivalents of formaldehyde with one of the following: substituted phenol, melamine, urea, benzoguanamine, or glycouril. Such crosslinkers can be prepared and used as crosslinkers with the aid of acid or base catalysts, which is well known in this field. [Ref Henk van Dijk in *"The Chemistry and Application of Amino Crosslinking Agents or Aminoplasts"*, John Wiley and Sons 1999 and T Brukhart, P. Oberressi and P. K. T. Oldring, *"The Chemistry and Appplication of Phenolic Resins or Phenoplasts*, John Wiley and Sons", 1998]. The methylol crosslinkers can be in monomer form, or a self condensed oligomer or polymer form. In a prefered embodiment of this invention the methylol crosslinker is added to a dilute solution of the polyamino compound (<5%).

Crosslinkers Containing at Least Two Oxirane Groups

Suitable crosslinkers belonging to this group are organic compounds containing at least two oxirane groups. These include compounds containing two and more oxirane groups and homopolymer or copolymer containing poly-oxirane groups. An organic fragment that can be an alkyl, aryl substituted alkyl or substituted aryl can link the oxiranes.

Suitable compounds containing two or more oxirane groups are but not limited to bisphenol A epoxy resin, di or poly glycidyl ether of diols or polyols, glycidyl ester of a polycarboxylic acid, di or polyglycidyl aliphatic or aromatic amines, or epoxy obtained from peroxidation of unsaturated compounds, homopolymer or copolymer of glycidyl(meth) acrylate. Specific examples consist of bisphenol A epoxy, butanediol diglycidyl ether, triglycidyl isocyanurate, 4,4'-methylenebis-(N,N-diglycidylaniline), glycerol propoxylate triglycidyl ether, diglycidyl 1,2-cyclohexanedicarboxylate, N,N'-diglycidyl-4-glycidyloxyaniline, poly(propylene glycol)diglycidyl ether, poly((phenyl glycidyl ether)-co-formaldehyde), poly(ethylene glycol)diglycidyl ether, 4-vinyl-1-cyclohexene diepoxide, diglycidyl resorcinol ether, 1,2,3,4-diepoxybutane, 1,2,7,8-diepoxyoctane, 1,3 diglycidyl glycerol ether, novalak epoxy resin, poly (dimethylsiloxane)diglycidyl ether terminated, poly [dimethylsiloxane-co-[2-(3,4-epoxycyclohexyl)ethyl] methyl-siloxane], polyglycidylmethacrylate, polyglycidylacrylate, poly(ethylene-co-methyl acrylate-co-glycidyl methacrylate), poly(ethylene-co-glycidyl methacrylate).

An appropriate accelerator or catalysts for the reaction between epoxy and amine can be added to the polyamine formulation. Suitable accelerators are Lewis acid or bases examples of which are but not limited to triethylenediamine (1,4-diazabicyclo[2.2.2]octane), triethanolamine, triethylamine, triethanolamine ethoxylate, tripropylamine, trifluoroboronmonoethylamine (boron trifluororide-ethylamine complex), tertiary amine, pyridine, 2,4,6-tris (dimethylaminomethyl)phenol, benzyldimethylamine, piperidine, N-hydroxyethylpiperazine, N,N'-dimethylamino phenol, triphenyl phosphine and mixtures of two or more thereof. These catalysts can be used for any oxirane containing crosslinker used in this invention.

Crosslinkers Containing at Least One Oxirane and One Acrylate(methacrylate) Groups.

Suitable compounds that belong to this group are organic compounds that contain at least one oxirane and one acrylate (methacrylate) group The acrylate and the oxirane groups can be linked by an organic fragment which can be an alkyl, aryl, substituted alkyl or substituted aryl. The compounds can contain multi or poly (meth)acrylate and oxirane groups. Compounds containing acrylate and oxirane group are more preferable as the chemical reactivity of acrylate with amine is higher than oxirane so polyamine containing oxirane groups can be formulated and further crosslinked on the oxidized polymer surface.

Such compounds are, for example, obtained by reacting epoxy compound such as those referred to above with one (meth)acrylic acid or by condensing compounds containing (meth)acrylate with hydroxyl or carboxylic groups with epihalohydrins. Specific examples are but not limited to glycidylacrylate, glycidyl methacrylate, epoxy acrylate of bisphenol A, 2-hydroxy-3-(4-oxiranylmethoxybutoxy)-propyl acrylate, 2-hydroxy-3-[4-[1-methyl]-1-(4-oxiranylmethoxyphenyl)-ethyl-phenoxy]propyl acrylate, aromatic epoxy polyacrylate such as EPON Resin 8021, 8101, 8111, 8121, and 8161 from Shell Chemical Company, Epoxyacrylate Ebecryl 3605(from UCB).

Crosslinkers Containing at Least Two Acrylate (methacrylate) Groups

Suitable crosslinkers of this group are organic compounds containing at least two (meth)acrylate groups. The (meth) acrylate group are linked by an organic fragment which can be an alkyl, aryl, substituted alkyl or substituted aryl. Compounds containing one acrylate and one or more methacrylate groups are preferable because the difference in the rate of reaction between acrylate and methacrylate with amines allows for a formulation with a long pot life. In a typical formulation initial reaction of the amine with acrylate is fast whilst the reaction with methacrylate is slower therefore making the final crosslinking step in solution slower.

Specific examples of these crosslinkers are but not limited to 2-(acryloxy)ethermethacrylate, ethoxylated bisphenol A di(meth)acrylate. polyethylene glycol di(meth)acrylate, 1,3-butylene glycol di(meth)acrylate, propoxylated neopentyl glycol di(meth)acrylate, alkoxylated aliphatic di(meth) acrylate ester, tris(2-hydroxyl ethyl)isocyanurate tri(meth) acrylate, pentaerythritol tri(meth)acrylate, glycerol propoxylate tri(meth)acrylate, pentaerythritol tetra(meth) acrylate, dipentaerythritol penta(meth)acrylate, di or tri (meth)acrylate methacrylate ester, di or tri (meth)acrylate acrylate ester, aliphatic urethane (meth)acrylate, aromatic urethane (meth)acrylate.

Crosslinker Containing One or More Halogens and One or More Selected from the Group Oxirane, (meth)acrylate, aldehyde, isocyanate and anhydride Suitable crosslinkers of this group are organic compounds containing at least one or more halogens and one functional group selected from the groups oxirane, (meth)acrylate, aldehyde, isocyanate and anhydride. The halogen(s) and the other group are linked by an organic fragment which can be an alkyl, aryl, substituted alkyl or substituted aryl.

Examples of suitable compounds are but not limited to epichlorohydrin, epibromohydrin, epiiodohydrin, 2-bromoethyl acrylate, 3-bromopropyl acrylate, 4-bromobutyl acrylate, 6-bromohexyl acrylate, 7-bromoheptyl acrylate, 8-bromooctyl acrylate, 9-bromononyl acrylate, 11-bromoundecyl acrylate, 12-bromododecyl acrylate, 2-chloroethyl acrylate, 2-(2-chloroethoxy) ethyl acrylate, 2-[2-(2-chloroethoxy)ethoxy] ethyl acrylate, 4-chlorobutyl acrylate, 2-chlorocyclohexyl acrylate, 10-chlorodecyl acrylate, 6-chlorohexyl acrylate, 3-chloro-2,2-dimethylpropyl acrylate, 1-chloro-2-methyl-2-propyl acrylate, 8-chlorooctyl acrylate, 3-chloropropyl acrylate, 2-bromoethyl isocyanate, 2-chloroethyl isocyanate, 4-chlorobutyl isocyanate, trichloroacetyl isocyanate, 2-hydroxy-3-(2-chloroethoxy)propyl acrylate, 2-hydroxy-3-(4-chlorobutoxy)propyl acrylate.

For the halogen containing crosslinkers an inorganic acid, organic acid or a mixture of both can be added to the polyamine formulation to increase the pot life of the solution. Preferably an organic acid is added to the polyamine formulation so that the pH is less than 6, if the formulation is required to be stored for more than one day. Suitable acids include but are not limited to hydrochloric acid formic acid, acetic acid and oxalic acid.

Crosslinkers Containing One or More Halohydrin Group(s) and One Other Group Selected from oxirane, (meth)acrylate Suitable crosslinkers of this group are organic compounds containing at least one or more halohydrin group(s) and one functional group selected from oxirane, (meth)acrylate, aidehyde. The halohydrin group(s) and the other group are linked by an organic fragment which can be an alkyl, aryl, substituted alkyl or substituted aryl. Suitable compounds are adducts of epihalohydrin with (meth)acrylate hydroxyl, (meth)acrylate acid compounds or adducts of epoxy compounds partially reacted with halogen hydride or epoxy acrylate compounds with halogen hydride. Examples are but not limited to 3-bromo-2-hydroxy propyl acrylate, 3-chloro-2-hydroxy propyl acrylate, 2-(3-chloro-2hydroxy)propoxy-ethyl acrylate, 2-(3-bromo-2-hydroxy)propoxy-ethyl acrylate, 3-(3-chloro-2-hydroxy)propoxy-propyl acrylate, 3-(3-bromo-2-hydroxy)propoxy-propyl acrylate, 4-(3-chloro-2-hydroxy)propoxy-butyl acrylate, 4-(3-bromo-2-hydroxy)propoxy-butyl acrylate, 2-(3-chloro-2-hydroxypropoxycarbonyl)ethyl acrylate, 2-(3-bromo-2-hydroxypropoxycarbonyl)ethyl acrylate.

Crosslinkers Containing at Least Two Anhydride Groups

In yet another preferred embodiment the crosslinker can contain at least two anhydride functional groups. The anhydride groups can be linked by an alkyl, aryl, substituted alkyl or substituted aryl. The anhydrides can be discrete molecules such as but not limited to pyrromellitic dianhydride, 1,4,5, 8-Naphthalenetetracarboxylic dianhydride, 3,4,9,10-perylenetetracarboxylic dianhydride. Anhydride crosslinkers can also be polymeric materials such as but not limited to maleic anhydride copolymers with ethylene, propylene or maleic anhydride grafted onto polymers. These polymers can be homopolymers or copolymers made from many types of monomer units including ethylene, propylene, isoprene, butadiene, methylacrylate, ethylacrylate methacrylate, butylacrylate. The crosslinker is preferably present in solution at a concentration of less than 5%, preferably 0.001 to 5% and most preferably from 0.01 to 1% by weight.

Solvents

Any suitable solvent or mixture of solvents can be used in the current invention and solvent should be chosen that is compatible with polyamine and crosslinker. A preferred solvent, particularly because of occupational safety and environmental considerations is water, particularly with PEI, although the solubility of the crosslinker should also be considered.

Formation of Crosslinked Polyamine Layer on the Polymer Surface

There are two general methods for formation of the polyamino crosslinked surface/interface. The methods are:

A. Premixing the polyamino compound and crosslinker. The polyamino compound and the crosslinker are premixed under suitable conditions. Suppression of crosslinking before application to the oxidised substrate is essential. This can be achieved by preparing the polyamino crosslinking mixture as a dilute solution as is the case of using aldehyde crosslinkers such as glutaraldehyde with PEI. Another way to prevent unwanted crosslinking is to use a crosslinker that requires an external input to proceed, for example, a chemical initiator or catalyst such as water for silane based crosslinkers or a physical input, for example heat for maleated anhydride crosslinkers. Also crosslinking can be controlled by varying the reactivity of the functional groups for example by using a combination of relatively reactive acrylate functional groups with less reactive methacrylate or epoxide groups. The extent of crosslinking in solution can also be minimised by mixing the polyamino compound and crosslinker just prior to contact with the polymeric surface.

B. Step wise addition of the polyamino compound and the crosslinker. This method is particularly suitable for crosslinkers that rely on very reactive functional groups, such as acid chlorides or isocyanates. The polyamino compound can be applied to the surface first and the crosslinker applied afterwards.

The polyamino/crosslinking solutions can be applied by many standard methods which include but are in no way limited to spray coating, dipping, roll coating, meniscus coating, spin coating, gravure coating etc. Once the solution is applied the solvent can be evaporated off either under ambient conditions or at elevated temperatures using an oven, infrared radiation or any other common method. On the other hand excess solution can be removed by washing with clean water or another solvent or blown off using a high pressure gas such as compressed air. The time taken between the contact of the grafting solution with the polymeric substrate and drying is from 0.001 seconds to 4 hours. When dip coating is used an external physical field such as ultrasonication can be applied during dipping to enhance the grafting of polyamino compounds. After the polyamino compound is adsorbed on the surface a suitable physical fields such as heat, IR, microwave, etc can be used to enhance or initiate the crosslinking reaction of the polyamino compounds.

The polyamine and crosslinking agent are preferably applied to the substrate surface at a rate of less than 2 g of the total of polyamine and crosslinker per square meter of surface area. Generally the thickness of the crosslinked network will be less than 3 microns.

Functional Crosslinked Interfaces and the Adhesion of Coatings

This invention allows for the preparation of a predefined multifunctional interface/interphase which can be designed to optimise specific interactions with various functional coatings or molecules. These coatings can have a thickness in the order of a molecular monolayer to a few millimeters and in a preferred embodiment of this invention the functional coatings are applied after the polyamino crosslinked interphase has been grafted to the surface of the polymer substrate. The coatings may impart on the substrate many different properties which include but are not limited to the following:

improved permeability characteristics towards gases, odours or vapours
conductivity either electrical or ionic
magnetic properties
biocompatability
controlling surface wettability
improved surface hardness
slip enhancement or slip reduction
absorption or reflection of UV-vis, IR, MW or RF
photovoltaic properties
electroluminesence
chemical catalytic properties
linear or nonlinear optical properties The coatings may also have a decorative and/or informative function such as paint, varnishes, lacquers and printing inks. The coating can also be an adhesive for the joining of the treated polymer substrate to another material.

For those experienced in the art, knowledge of the components of a coating can be used to determine what type of polyamino/crosslinker will provide optimal interactions. For example it is well known that polyvinyl alcohol (PVOH) can be used as barrier coatings for plastic films. A major factor that governs the successful use of PVOH is its adhesion to substrates with particular difficulties arising from coating on inert polymer substrates such as polyethylene or polypropylene. It is also well known that aldehydes bond to polyvinyl alcohols, thus a polyamino network crosslinked with glutaraldehyde will provide free aldehyde groups which will lead to bond formation with PVOH based coatings.

Another advantage of this invention is that grafted polyamino compounds crosslinked with silanes will form strong bonds with silanes present in coating, adhesive or sealant formulations a situation which is common in many commercial formulations today. Another common component in many commercial formulations is melamine, urea, benzoguanamine, or glycouril, thus an aldehyde containing crosslinker would be compatible with such formulations.

Another important application area is improving the interaction between polymer substrates and metallic coatings such as aluminium, copper, platinum, silver, gold etc. With this invention improved adhesion at the polymer metallic coating interface is obtainable using a variety of polyamino crosslinked formulations where strong interactions are expected between the amino groups and the metallic coatings. The interactions between the crosslinked polyamino surface and metal coatings such as copper, platinum, silver or gold, could be further improved if sulfur compounds were present in the crosslinked structure, which could be easily achieved using a polyamino system crosslinked with a silane and a silane co-crosslinker that contains sulfur groups, such as mercaptopropyl trimethoxysilane or bis[(triethoxysilyl)propyl]tetrasulfane.

Also the adhesion of inorganic oxides or inorganic salts on polymer films can be enhanced by this invention if the crosslinkers contained for example silanes or beta-diketones, a well known metal binding group which would be present if methyl pyruvate was used as a crosslinker.

In another embodiment, this invention provides a very useful and cost effective method to engineer on a polymeric material a crosslinked surface containing highly reactive functional groups for multi step surface coupling of molecules possessing specific physico-chemical properties. Groups available include amine group from the polyamine and other functionalities from the crosslinkers and co-crosslinkers. Suitable compounds for multi step surface coupling are molecules containing reactive groups selected from acidic group (carboxylic, sulfonic, phosphoric/phosphonic), (meth)acrylate, epoxy, aldehyde, hodroxyl, thio, isocyanate, isothiocyanate, anhydride, halide. These compounds can be small molecules with 2 to 60 carbon atoms, or macromolecules with molecular weight ranged from a few hundreds to a few millions. They can also be inorganic species such as metal salts, oxides or chelate complexes.

The process for this multi step surface grafting is:

A) providing polymer surface with functionalities by suitable oxidation method

B) contacting the polymer surface with a polyamine formulation

C) contacting molecules of interest with the polymer surface

Highly water wettable surface on polymer substrate can be made by contacting the surface during "step C" with solution containing ionic and no ionic water soluble macromolecules. Macromolecules of interest include polysacharides, homopolymer or copolymers made from acrylic acid, vinylsulfonic acid or 4-styrenesulfonic acid, polymetaphosphoric acid, polyvinyl alcohol, or aminoacids. Preferably the macromolecules should contain acrylate or aldehyde and carboxylic groups such as modified dextran, polyacrylic acid, modified polyvinyl alcohol, poly(acrylic acid-co-acrylamide). Catalyst for activation of acid group such as carbodiimide, N-hydroxy-succimidyl can be used to improve the chemical coupling of acidic containing molecules.

Antifouling and/or antibacterial surface can be made by contacting the surface during "step C" with solution containing polyethylene glycol, polypropylene glycol, peptides, lysozyme. Preferable compounds are polyethylene glycol mono or diacrylate, polyethylene glycol mono or diglycidyl, are polyethylene glycol mono or dialdehyde.

The bio-activity/bio-compatibility of polymer can be improved by contacting the polymer surface "during step C" with bio-active/bio-compatible molecules. It is well known that polyglutaraldehyde can covalently bind amino groups thus a polyamino/glutaraldehyde crosslinked system containing excess glutaraldehyde would be an excellent surface for binding bioactive molecules such as peptides, proteins or enzymes.

UV/IR inhibitor, absorbers, or fluorescent compounds can be grafted onto the surface during "step C" to provide an effective method to reduce UV or laser damage of the substrate.

The invention will now be described with reference to the following examples. It is to be understood that the examples are provided by way of illustration of the invention and that they are in no way limiting to the scope of the invention.

EXAMPLES

Examples 1–10 highlight how the use of polyamino crosslinked interphases improves the thermal stability of paint adhesion to polymer substrates compared to non crosslinked systems. In these examples a polymer substrate is flame treated, then either treated with a crosslinking formulation or in some cases a non-crosslinking formulation, painted with automotive paint and the adhesion of the paint to the substrate is measured. The results for examples 1–10 are given in table 1.

Example 1

A flat specimen (30 mm×50 mm×3 mm) of a mineral filled automotive grade PP of Corton 1054/2 HS:Natural (from Montell/Poly Pacific Australia) was flame treated with an Aerogen FT Lab Model flame treatment unit using the following conditions:

| air flow rate | 220 L/min |
|---|---|
| oxygen level | 0.4% |
| conveyer speed | 60 m/min |
| distance from flame | 10 mm |

After flame treatment the sample was sprayed with a Lupasol FC/glutaraldehyde formulation. This formulation was prepared the day before by mixing 200 mg of a 50% glutaraldehyde solution with 100 mL of a 0.1% water solution of Lupasol FC (by weight of total solids) with 2 minutes of vigorous mixing. The solution was kept in contact with the flame treated surface for 10 seconds then the excess solution was blown off with high pressure air. The sample was then painted with a Heron White base coat and a clear polyurethane top coat (PPG, Melbourne Australia) and cured in accordance with manufacturers instructions. The painted sample was then immersed in a water bath at 80° C. for 3 days. The paint adhesion was assessed by pull-off test (ASTM D 4541-89) using an Instron tester. For this test two measures of adhesion are reported here, one is the pull off strength, measured in MPa and the other is the cohesive failure of the substrate given as a percentage. The higher the value for both of these measurements the better the adhesion.

Example 2

As for example 1 except the grafting solution was a Lupasol WF/glutaraldehyde formulation.

Example 3

As for example 1 except the grafting solution was a 0.1% solution of a Lupasol FG/A-186 formulation. Lupasol FG is a water free PEI as opposed to Lupasol FC which has the same molecular weight polymer but contains 50% water. The A-186 is an epoxy silane (Witco). The original formulation is prepared by mixing 5 g of Lupasol FG in 10 g of iso-propanol with 5 g of A-186. This mixture was allowed to stand at room temperature for four days to give optimise reaction of amine with the epoxide group of A-186. This solution was then diluted with water to give a 0.1% solution (by total weight of solids) which was used within 1 hour of water dilution.

Example 4

As for example 3 except the 0.1% Lupasol FG/A-186 solution was allowed to stand for 7 days. This example shows that it is important for crosslinking to occur on the surface and not before. In this case the crosslinking silane groups would have reacted after seven days in water and therefore no crosslinking is expected to occur on contact with the flame treated surface.

Example 5

As for example 1 except the grafting solution was a 0.1% by weight Lupasol FC/AOEM formulation (where AOEM=

2-(acryloxy)ethermethacrylate). This formulation was prepared by adding 1.5 g of AOEM to 1 g of Lupasol FC in 9.0 g of ethanol. This mixture was kept at room temperature for 24 hours then diluted to 0.1% (total weight of solids) with water.

Example 6

As for example 1 except the grafting solution was a 0.05% by weight Lupasol WF/CHPA formulation (where CHPA= 3-chloro-2-hydroxypropylacrylate). This formulation was prepared by adding 1.6 g of CHPA to 1.0 g of Lupasol WF in 10 mL of a 50:50 water/ethanol mixture. The solution was stirred for 24 hours and diluted to 0.05% with water.

Example 7

As example 1 except the grafting solution was a 0.1% by weight of Lupasol FC/GA formulation (where GA=glycidylacrylate). The formulation was prepared by adding 0.33 ml GA to 0.1 g of Lupasol FC in 10 ml ethanol mixture. The mixture was stirred for 15 minutes then diluted to 0.1% with water and applied to the oxidised surface.

Example 8

As fore example 1 except a 0.1% solution of Lupasol FC was used without any crosslinker. This example teaches that without a crosslinker the polyamine compound is less effective surface for paint adhesion.

Example 9

As fore example 8 except a 0.1% solution of Lupasol WF was used.

Example 10

As for example 1 except no grafting chemical was applied and the sample was only flame treated. This example shows that hydro-thermal stability of paint adhesion is inferior for surfaces which contain no amino group.

TABLE 1

Hydrothermal stability of Heron White paint on surface treated Corton PDR 1054/2 HS Natural. See examples 1 to 10 for details.

| Treatment | Pull off strength (MPa) after 3 days @ 80° C. | Cohesive failure of the substrate (%) |
|---|---|---|
| Example 1 Lupasol FC/Glutaraldehyde | 5.1 | 49 |
| Example 2 Lupasol WF/Glutaraldehyde | 5.1 | 66 |
| Example 3 Lupasol FG/A-186 | 4.7 | 29 |
| Example 4 Lupasol FG/A-186 after 7 days | 2.4 | 5 |
| Example 5 Lupasol FC/AOEM | 5.0 | 60 |
| Example 6 Lupasol WF/CHPA | 5.1 | 60 |
| Example 7 Lupasol FC/GA | 4.2 | 20 |
| Example 8 Lupasol FC | 3.9 | 10 |
| Example 9 Lupasol WF | 4.0 | 7 |
| Example 10 flame only | 2.5 | 3 |

Example 11

This example highlights use of a Lupasol FC/Permanol KP5 (from Clariant) formulation as the grafting chemical 0.1% Lupasol FC and 0.25% Permanol KP5 in water was applied as either a mixture or separately with Lupasol FC being applied first. The samples were painted in the same way as given in example 1 but were immersed in water at 80° C. for 2 days. A sample was also prepared using a 0.1% FC solution to compare results without for a formulation without the Permanol KP5 crosslinker. The results of paint adhesion test, as described in example 1, are given in Table 2.

TABLE 2

Hydrothermal stability of Heron White paint on surface treated Corton PDR 1054/2 HS Natural. See example 11 for details.

| Treatment conditions | Strength (MPa) after 2 days @ 80° C. | Cohesive Failure of substrate (%) |
|---|---|---|
| Flame only | 3.2 | 7 |
| Flame + 0.1% Lupasol FC | 4.1 | 18 |
| Flame + (0.1% FC + 0.25% KP5) | 6.1 | 90 |

Example 12

In this example an electroconductive layer was prepared on the surface of Corton PDR 1054/2 HS Natural. This layer was then painted as described in example 1. Such a system were the polymer is coated with a conducting layer could be used for the electostatic painting of plastic parts. An important aspect for this methodology is the adhesion of the conducting layer to the substrate. In this example improved adhesion of the electroconductive layer to the supporting substrate was observed for a lupasol FC crosslinked with Permanol KP5 compared with a non crosslinked FC interface and no polyamino interface at all. Also better adhesion properties are obtained if the Lupasol FC and Permanol KP5 are added stepwise as indicated in Table 3. The polymer substrate was flame treated as described in example 1 and the grafting solutions were applied. The Permanol grafting solutions were prepared in water to the concentrations given in table 3. The electroconductive coating was Baytron P (from Bayer) which was applied as a 30:70 solution and gave a surface conductivity of about $5 \times 10^5$ ohm when applied at a thickness of about 1 $\mu$m. All the films had similar conductivities regardless of surface treatment. The hydrothermal stability of the coating adhesion to the substrate after corona treatment, chemical grafting, coating with Baytron P and painting with Heron white and top coat as described in example 1, was measured by immersing the sample in water at 80° C. for 2 days and conducting pull off tests as described in example 1. The results are shown in table 3.

TABLE 3

The hydrothermal stability of Baytron P on Corton Corton PDR 1054/2 HS Natural. Experimental conditions given in example 12.

| Treatment conditions before application of Baytron P 30:70 in isopropanol. | Strength (MPa) Wet (2 days @ 80° C.) | CF (%) |
|---|---|---|
| flame only | 0.3 | 0 |
| 0.01% FC | 1.8 | 0 |
| 0.01% FC + 0.01% KP5 (stepwise) | 3.3 | 15 |
| 0.01% FC/0.01% KP5 (as a mixture) | 2.1 | 0 |

Example 13

This example compares an untreated and treated 63 $\mu$m thick biloriented polypropylene (BOPP) film. The films were treated using corona discharge at an Energy Level of 40 mJ/mm$^2$. The following conditions were assessed:
1. Untreated
2. Corona only 3. Corona followed by grafting of a 0.1% Lupasol FG/0.1% Silquest Y-15078 formulation where Silquest Y-15078 is an epoxy silane (from Witco).

The quality of adhesion of UV-cured ink to the PP substrate was determined by a peel test using 3M self-adhesive tape 8981 and assessing the percentage of ink delamination from the film after 20 hours immersion in 38° C. water. The results are shown in Table 4.

TABLE 4

Peel test for ink adhesion on treated BOPP film. See example 13 for details of treatment.

| Treatment Condition | Peel Test Result % Ink delamination |
|---|---|
| 1. Untreated | 100 |
| 2. Corona only | 100 |
| 3. Corona + 0.1% Lupasol FG/0.1% Y-15078 | 10 |

Example 14

Pure PP sheet (0.4 mm thick from Goodfellow) was corona treated at a distance of 2.5 mm from the electrode at 141 mJ/mm². A polyamine formulation was prepared by adding 0.26 g polyallylamine (Mw=60000) to 0.45 g CHPA (3-chloro-2-hydroxylpropyl acrylate) in 10 ml alcohol. Acetic acid was added in to make the solution at the pH 4.5. The solution was then stirred at room temperature for 24 hours and dilute with alcohol to 1% and dip coated on corona treated PP surface. The modified surface was dried at 110° C. for 10 minutes then grafted with following chemicals:
a) Corona treated PP in water, 60° C. for 20 hours;
b) Corona then treated with polyallylamine/CHPA formulation as above condition;
c) As "b" plus 10% Polyethylene glycol diglycidyl ether (Mw=24000) in water (containing 8% potassium sulfate), 60° C. for 20 hours
d) As "b" plus 10% Polyethylene glycol (PEG) diacrylate (Mw=600) in water/alcohol (70/30) (containing 8% potassium sulfate), 60° C. for 20 hours Samples were then rinsed 5 times by mixed water/alcohol (70/30), dried overnight and analysed by XPS. The results are shown in Table 5. Clearly PEG was successfully grafted onto the polypropylene surface oxidised by corona and contacted with polyamine formulation as the ratio of oxygen to carbon is significantly higher.

TABLE 5

Surface chemistry polypropylene treated as given in example 14.

| Sample Treatment | Oxygen:Carbon ratio as determined by XPS |
|---|---|
| a | 0.057 |
| b | 0.182 |
| c | 0.299 |
| d | 0.294 |

Example 15

This example demonstrates that a UV/IR inhibitor, absorber or fluorescent probe can be incorporated into the crosslinkable polyamine formulation to provide a surface layer containing UV inhibitor or fluorescent probe when it forms a crosslinked structure. A polyamino crosslinking formulation was prepared by adding 0.26 g polyallylamine (Mw=60000) to 0.45 g 3-chloro-2-hydroxylpropyl acrylate (CHPA) in 10 ml of alcohol. 0.026 g 4(5)carboxylfluorecein (CL) or 4(5)carboxylfluorecein hydroxyethyl acrylate (CLEA) was added in the formulation. The mixture was stirred at room temperature for two hours than diluted to 1% in alcohol. All the polypropylene specimens were treated by corona at 2.5 mm from the electrode and 142 mJ/mm² and then dip coated with a grafting solution, dried at 110° C. for 10 minutes and washed by immersion in a water bath heated at 80° C. overnight. The surface was excited at 490 nm and fluorescence intensity recorded at 550 nm by a fluorescence spectrometer.

TABLE 6

Relative fluorescence intensity of Polypropylene Treated surfaces excited at 490 nm and measured at 550 nm.

| Applied fluorescent solution on corona treated PP | Relative fluorescence intensity | Colour of treated sample |
|---|---|---|
| 0.1% CL | 1 | No |
| 0.1% CLEA | 1 | No |
| 1% polyallylamine + CHPA + CL (0.1%) | 200 | Yes (Orange) |
| 1% polyallylamine + CHPA + CLEA (0.1%) | 280 | Yes (Orange) |

Example 16

In this example, the surfaces of samples of polypropylene (PP) were treated by various methods and were painted with a acrylic basecoat (Dupont white) followed by a two-part polyurethane clearcoat.

The various surface treatments were:
(i) no treatment
(ii) oxidative treatment by flame (air/propane ratio=1.0%, treatment speed (iii)=15 m/min, treatment distance=10 mm, 1 single treatment)
(iii) oxidative treatment by flame as described in (iii), followed by dipping for 30 seconds in a 0.5% solution polyethyleneimine; (PEI) (Mn=25000) and technical ethanol. The treated polymers surfaces were further rinsed by water and ethanol before drying and subsequent paint application.
(iv) oxidative treatment by flame as described in (iii), followed by dipping for 30 seconds in a 0.5% solution containing precured Butanediol diglycidyl (ButDODG) with polyethyleneimine (PEI) (Mn=25000) and technical ethanol. The treated polymers surfaces were further rinsed by water and ethanol before drying and subsequent paint application. The precuring of the epoxy formulation was carried out by mixing 10% by weight of ButDODG with PEI in an epoxy/amine ration of 2 in dimethylsulphoxide (DVSO). The solution was then allowed to be precured at 20° C. for 22 days. The procured solution was further diluted to a 0.5% solution in technical ethanol prior to the application to the pre-oxidised polymer surface.

The results are listed in Table 6.

TABLE 7

Pull-out strength (MPa) of PP painted with a Dupont White acrylic basecoat and a polyurethane clearcoat.

| Surface Treatment | Pull-out Strength (MPa) |
|---|---|
| No treatment | 0.0 |
| Flame | 1.3 |
| Flame + PEI | 1.8 |
| Flame + 0.5% ButDODG/PEI | 3.5 |

It can be seen from Table 7 that untreated PP has no adhesion to the acrylic paint used in this work. Although surface oxidation on PP by flame treatment leads to significant improvement of paint adhesion from zero to 1.3 MPa, the paint adhesion on PP can be even further increased nearly 3-fold when a precured ButDODG/PEI crosslinking layer was grafted onto the pre-oxidised polymer surface.

Finally, it is to be understood that various other modifications and/or alterations may be made without departing from the spirit of the present invention as outlined herein.

It is to be understood that the invention described hereinabove is susceptible to variations, modifications and/or additions other than those specifically described and that the invention includes all such variations, modifications and/or additions which fall within the spirit and scope of the above description.

Example 17

This example demonstrate method to make water wettable surface using a multi step surface grafting process. Pure polypropylene sheet (0.4 mm, Goodfellow) was oxidized by corona, followed by application of polyamine compounds and then grafting with water soluble macromolecules.

Solutions used are:
A. 1% polyamine formulation in alcohol. Polyamine formulation was prepared by adding 0.25 g poly(allylamine) (Mw=60000) to 0.40 g CHPA (3-chloro-2-hydroxypropyl acrylate) in 10 ml alcohol. The solution was adjusted to pH 5.1 with acetic acid and stirred for 24 hours before diluted to 1%.
B. 0.5% dextran acrylate aqueous solution. Dextran (Mw=74000) is grafted glycidylacrylate.
C. 0.5% polyacrylic acid (Aldrich, Mw=250000) in aqueous solution.

Specimens were treated by corona as for example 14 then either;
i) immersion in solution B or C at 50° C. for 16 hours;
ii) dipping coated with solution A, heated to 110° C. for 10 minutes then immersed in 50° C. hot water for 16 hours;
iii) dipping coated with solution A, heated to 110° C. for 10 minutes then immersed in Solution B or C at 50° C. for 16 hours.

The specimens were then washed with distilled water twice in ultrasonication bath 5 minutes each and rinsed with distilled water, dried at 80° C. for 20 hours. The contact angle and wettability measurement were then carried out and results are given in the following table. Good weftability means that water layer is completely covered the specimen surface when it is immersed in water and pulled out and the water layer evaporates off slowly (more than 1 minute). Poor wettability means that water layer breaks and dried out quickly.

TABLE 8

Improved wettabilty of PP surface after accelerated aging. See example 17

| Treatment | Contact angle (degree) | Wettability |
| --- | --- | --- |
| i) Corona + Solution B | 74 | Poor |
| i) Corona + Solution C | 75 | Poor |
| ii) corona + Solution A + water | 70 | Poor |
| ii) corona + Solution A + Solution B | 50 | Good |
| ii) corona + Solution A + Solution C | 45 | Good |

The results show that the hydrophilicity and water wettability of PP surface were improved by further grafting of water soluble macromolecules on the crosslinked polyamine surface.

What is claimed is:

1. A method of improving the bonding between a polymeric surface and a coating or adhesive comprising the steps of:
   (i) providing the polymeric surface with functional groups; and
   (ii) contacting the surface provided with functional groups with (a) at least one polyamine compound reactive with the surface functional groups, said polyamine comprising at least four amine groups including at least two amine groups selected from primary and secondary amine groups, (b) at least one crosslinking agent reactive with the polyamine so that a bond is formed between the polyamine and the crosslinking agent wherein component (b) is contacted with the surface either in admixture with component (a) or following contact of the surface with component (a) and (c) when the crosslinking agent is an organosilane optionally including a co-crosslinker that is reactive with the crosslinking agent to form a crosslinked network on the polymeric surface; and
   (iii) contacting the crosslinked network with an adhesive or coating to form a bond between the polymeric surface and said adhesive or coating and wherein the coating is selected from the group consisting of an ink, paint, varnish, lacquer, metallic coating, and an inorganic oxide coating.

2. A method according to claim 1 wherein the polyamine and crosslinking agent is applied to the polymeric surface as a premixed solution or by first applying a polyamine solution and then applying the crosslinking agent.

3. A method according to claim 1 wherein said functional groups are selected from the group consisting of hydroxyl, carboxyl, carbonyl, ester lactone, peroxide, anhydride, halogen, sulphonate and mixtures of two or more thereof.

4. A method according to claim 1 wherein the surface is contacted with one or more solutions containing said polyamine and said crosslinking agent in a solvent wherein the concentration of each of the polyamine and crosslinking agent is in the range from 0.0001 to 50% by weight.

5. A method according to claim 4 wherein the concentration of each of the polyamine and crosslinker is in the range of from 0.001 to 5% by weight.

6. A method according to claim 1 wherein the polyamine compound is selected from the group consisting of polyamine polymers of molecular weight in the range of from 200 to 2000000 and non-polymeric compounds containing from 6 to 30 carbon atoms.

7. A method according to claim 6 wherein the polyamine is a polymer comprising at least one amine monomer selected from the group consisting of ethylenimine, allylamine, vinylamine, 4-aminostyrene, and aminated acrylate/methacrylate; and optionally one or more comonomers selected from the group consisting of ethylene, propylene, acrylate/methacrylate, and ethylene oxide.

8. A method according to claim 6 wherein the polyamine is a polyethylenimine, polyvinylamine or polyallylamine of molecular weight of from 400 to 750000.

9. A method according to claim 1 wherein the crosslinking agent has at least two functional groups including a first functional group reactive with an amino functional group of the polyamine and a second functional group reactive with a functional group present in the polyamine or crosslinking agent.

10. A method according to claim 1 wherein the crosslinking agent is selected from the group consisting of organofunctional silanes having an organic functional group for reaction with an amine and a silane group adapted to condense with other silane groups to form Si—O—Si bonds; aldol condensation reagents and products thereof; methylol crosslinkers; crosslinkers containing at least two oxirane groups; compounds containing at least one oxirane group and at least one acrylate or methacrylate group; compounds containing at least two groups independently selected from acrylate or methacrylate or methacrylamide or acrylamide; compounds containing one or more halogen groups and one or more groups selected from the group consisting of oxirane, methacrylate, acrylate, aldehyde, ketone, isocyanate and anhydride; compounds containing halohydrin and another functional group selected from the group consisting of oxirane, aldehyde, acrylate and methacrylate; and compounds containing at least two anhydride groups.

11. A method according to claim 10 wherein the crosslinking agent is a silane of formula:

X Si R$^1$ (R$^2$)$_2$ wherein

X is any organic fragment of from 3 to 60 carbon atoms containing at least one group selected from the group consisting of oxirane, anhydride, acid chloride, chloroformate, sulfonyl chloride, ketone, aldehyde, carboxyl, isocyanate, acrylate, methacrylate, acrylamide and alkyl halide;

R is a group susceptible to hydrolysis; and

R$^2$ are independently selected from groups susceptible to hydrolysis and the groups alkyl, aryl, vinyl, substituted alkyl substituted aryl and substituted vinyl.

12. A method according to claim 11 wherein the silane is of formula

Y—R$^1$Si R$^2$R$^3$R$^4$ wherein

R$^1$ is a group of formula C$_n$H$_{2n}$ wherein n is from 0 to 12 or a benzyl group of formula CH$_2$C$_6$H$_4$;

Y is selected from the group consisting of methacryloxy, acryloxy, acetoxy, halogen, glycidoxy, 4-chlorosulfonylphenyl, isocyanate, chloroformate, carbochloride, 3,4-epoxycyclohexyl and ureido;

R$^2$ is selected from the group consisting of chloro, C$_1$ to C$_{12}$ alkoxy and carboxylate of formula O$_2$CC$_n$H$_{2n+1}$ wherein n is an integer from 1 to 11; and R$^3$ and R$^4$ are selected independently from the groups chloro, C$_1$ to C$_{12}$ alkoxy, phenyl, cyclohexyl, cyclopentyl, C$_1$ to C$_{12}$ alkyl, and carboxylate of formula O$_2$CC$_n$H$_{2n+1}$ wherein n is an integer from 1 to 11.

13. A method according to claim 1 wherein the surface is contacted with a solution containing at least one polyamine, at least one organo silane crosslinking agent and at least one co-crosslinker wherein the co-crosslinker has the general formula SiR$^1$R$^2$R$^3$R$^4$ wherein R$^1$ and R$^2$ can be independently chosen from the groups; alkoxides with the general formula OC$_n$H$_{2n+1}$, where n=1 to 12, chlorides and carboxylates with the general formula OCC$_n$H$_{2n+1}$ where n=1 to 12 and R$^3$, R$^4$ can be independently chosen from; alkoxides with the general formula OC$_n$H$_{2n+1}$ where n=1 to 12; chlorides; carboxylates with the general formula O$_2$CC$_n$H$_{2n+1}$ wherein n=1 to 12; alkyl; aryl; vinyl; substituted alkyl; substituted vinyl; substituted aryl.

14. A method according to claim 1 wherein the weight ratio of polyamine to crosslinking agent is in the range of from 1:100 to 100:1.

15. A method according to claim 1 wherein the weight ratio of polyamine to crosslinking agent is in the range of from 1:10 to 10:1.

16. A method according to claim 1 wherein the polymeric surface is provided with functional groups by a method selected from the group consisting of chemical oxidation, chlorination, sulfonation and an oxidation method selected from corona discharge, flame treatment, plasma treatment, UV radiation, and ozone.

17. A method according to claim 1 wherein the crosslinked network is contacted with an ink, paint or lacquer.

18. A method of modifying a polymeric surface of a substrate comprising the steps of:

(i) providing the polymeric surface with functional groups; and (ii) contacting the surface with (a) at least one polyamine compound reactive with the surface functional groups said polyamine comprising at least four amine groups including at least two amine groups selected from primary and secondary amine groups, (b) at least one crosslinking agent reactive with the polyamine so that a bond is formed between the polyamine and the crosslinker and (c) when the crosslinking agent is an organosilane optionally including a co-crosslinker that is reactive with the crosslinking agent, to form a crosslinked network on the polymeric surface and wherein at least one crosslinking agents is selected from the group consisting of:

organo silane that contains within its structure at least one functional group reactive with an amine;

a compound that contains an oxirane covalently linked to either a methacrylate or acrylate group, a compound that contains a halogen covalently linked to a group selected from epoxide, or acrylate, methacrylate and isocyante; and compounds containing a halohydrin covalently linked to an oxirane or aldhehyde or acrylate or mathacrylate and mixtures thereof.

19. A method according to claim 18 wherein the said surface functional groups are selected from the group consisting of hydroxyl, carboxyl, carbonyl, ester lactone, peroxide, anhydride, halogen, sulphonate and mixtures of two or more thereof.

20. A method according to claim 18 wherein the surface is contacted with one or more solutions containing said polyamine and said crosslinking agent in a solvent wherein the concentration of each of the polyamine and crosslinking agent is in the range of from 0.0001 to 50% by weight.

21. A method according to claim 20 wherein the concentration of each of the polyamine and crosslinker is in the range of from 0.001 to 5% by weight.

22. A method according to claim 18 wherein the polyamine compound is selected from the group consisting of polyamine polymers of molecular weight in the range of from 200 to 2000000 and non-polymeric polymers containing from 6 to 30 carbon atoms.

23. A method according to claim 22 wherein the polyamine is a polymer comprising at least one amine monomer selected from the group consisting of ethylenimine, allylamine, vinylamine, 4-aminostyrene, and aminated acrytare/methacrylate; and optionally one or more comonomers selected from the group consisting of ethylene, propylene, acrylate/methacrylate, and ethylene oxide.

24. A method according to claim 22 wherein the polyamine is a polyethylenimine, polyvinylamine or polyallylamine of molecular weight of from 400 to 750000.

25. A method according to claim 18 wherein the crosslinking agent is selected from the group consisting of organo-functional silanes having an organic functional group for reaction with an amine and a silane group to condense with other silane groups to form Si—O—Si bond and mixtures thereof.

26. A method according to claim 25 wherein the crosslinking agent includes at least one silane of formula:

wherein
X is any organic fragment of from 3 to 60 carbon atoms containing at least one group selected from the group consisting of oxirane, anhydride, acid chloride, chloroformate, sulfonyl chloride, ketone, aldehyde, carboxyl, isocyanate, acrylate, methacrylate, acrylamide and alkyl halide;

$R^1$ is a group susceptible to hydrolysis; and $R^2$ are independently selected from groups susceptible to hydrolysis and the group alkyl, aryl, vinyl, substituted alkyl substituted aryl and substituted vinyl.

27. A method according to claim 26 wherein the silane is of formula

wherein
$R^1$ is a group of formula $C_nH_{2n}$ wherein n is from 0 to 12 or a benzyl group of formula $CH_2C_6H_4$;

Y is selected from the group consisting of methacryloxy, acryloxy, acetoxy, halogen, glycidoxy, carbomethoxy, 4-chlorosulfonylphenyl; isocyanate, chloroformate, carbochloride, 3,4-epoxycyclohexyl and ureido;

$R^2$ is selected from the group consisting of chloro, $C_1$ to $C_{12}$ alkoxy and carboxylate of formula $O_2CC_nH_{2n+1}$ wherein n is an integer from 1 to 11; and $R^3$ and $R^4$ are selected independently from the groups chloro, $C_1$ to $C_{12}$ alkoxy, phenyl, cyclohexyl, cyclopentyl, $C_1$ to $C_{12}$ alkyl, and carboxylate of formula $O_2CC_nH_{2n+1}$ wherein n is an integer from 1 to 11.

28. A method according to claim 18 wherein the surface is contacted with a solution containing at least one polyamine, at least one organo silane crosslinker and at least one co-crosslinker wherein the co-crosslinker has the general formula

wherein
$R^1$ and $R^2$ can be independently chosen from the groups; alkoxides with the general formula $O_2C_nH_{2n+1}$ where n=1 to 12, chlorides and carboxylates with the general formula $O_2CC_nH_{2n+1}$ where n=1 to 12 and $R^3$, $R^4$ can be independently chosen from the groups; alkoxides with the general formula $O_2C_nH_{2n+1}$ where n=1 to 12, chlorides, carboxylates with the general formula $O_2CC_nH_{2n+1}$ wherein n=1 to 12, alkyl, aryl, vinyl, substituted alkyl, substituted vinyl, substituted aryl.

29. A method according to claim 18 wherein the weight ratio of polyamine to crosslinking agent is in the range of from 1:100 to 100:1.

30. A method according to claim 8 wherein the weight ratio of polyamine to crosslinking agent is in the range of from 1:10 to 10:1.

31. A method according to claim 18 wherein the polymeric surface is provided with functional groups by a method selected from the group consisting of chemical oxidation, chlorination, sulfonation and an oxidation method selected from corona discharge, flame treatment, plasma treatment, UV radiation, and ozone.

32. A method according to claim 18 wherein the method further includes the step of contacting the surface having a crosslinked network grafted thereto with a further material selected from the group consisting of an adhesive, functional molecules and coating.

33. A method according to claim 32 wherein the coating is selected from the group consisting of an ink, paint, varnish, lacquer, metallic coating, inorganic oxide coating, conductive or magnetic coating, linear or non-linear optical coating, hard coating, UV-vis, IR, MW or RIF absorbing or reflective coating, barrier coating and permeable coating.

34. A method according to claim 6 wherein the polyamine is a non-polymeric compound selected from the group consisting of triethylene tetraamine, tris(2-aminoethyl)amine, tetraethylene pentaamine, pentaethylene hexamine, and benzene tetraamine.

35. A method according to claim 22, wherein the polyamine is a non-polymeric compound selected from the group consisting of triethylene tetraamine, tris(2-aminoethyl)amine, tetraethylene pentaamine, pentaethylene hexamine, and benzene tetraamine.

* * * * *

UNITED STATES PATENT AND TRADEMARK OFFICE
CERTIFICATE OF CORRECTION

PATENT NO. : 6,800,331 B2  
APPLICATION NO. : 10/120252  
DATED : October 5, 2004  
INVENTOR(S) : Bilyk et al.

Page 1 of 1

It is certified that error appears in the above-identified patent and that said Letters Patent is hereby corrected as shown below:

On the Title page, just after item (65) Prior Publication Data, please add the following data:

--Related U.S. Application Data

(63) This application is a continuation of application No. PCT/AU00/01272, filed on Oct. 19, 2000.

(30) Foreign Application Priority Data

Oct. 19, 1999  (AU)         PQ3521  
Dec. 30, 1999  (AU)         PQ4905--

On page 1, of the specification just after the Title "Preparation of Functional Polymeric Surface", please add the following:

--This application is a Continuation Application of PCT/AU00/01272, filed October 19, 2000, which is based upon and claims the benefit of Australia Patent Application Nos. PQ3521, filed October 19, 1999 and PQ4905, filed December 30, 1999, the entire contents of all applications are incorporated herein by reference in their entireties.--

Signed and Sealed this  
First Day of March, 2011

David J. Kappos  
*Director of the United States Patent and Trademark Office*